US009975435B2

(12) United States Patent
Salomonsen

(10) Patent No.: US 9,975,435 B2
(45) Date of Patent: May 22, 2018

(54) DEVICE FOR ENERGY SUPPLY OF TRAINS

(71) Applicant: Maintech AS, Trondheim (NO)

(72) Inventor: Jan Erik Salomonsen, Vikhamar (NO)

(73) Assignee: Maintech AS, Trondheim (NO)

( * ) Notice: Subject to any disclaimer, the term of this patent is extended or adjusted under 35 U.S.C. 154(b) by 210 days.

(21) Appl. No.: 14/767,002

(22) PCT Filed: Feb. 12, 2014

(86) PCT No.: PCT/NO2014/050022
§ 371 (c)(1),
(2) Date: Aug. 11, 2015

(87) PCT Pub. No.: WO2014/126480
PCT Pub. Date: Aug. 21, 2014

(65) Prior Publication Data
US 2015/0367736 A1    Dec. 24, 2015

(30) Foreign Application Priority Data

Feb. 12, 2013    (NO) .................................. 20130229

(51) Int. Cl.
*B60L 11/02* (2006.01)
*B60L 11/12* (2006.01)
(Continued)

(52) U.S. Cl.
CPC ................ *B60L 11/02* (2013.01); *B60L 7/00* (2013.01); *B60L 11/123* (2013.01); *B60L 11/18* (2013.01); *B60L 11/1816* (2013.01); *B60L 11/1851* (2013.01); *B60L 11/1861* (2013.01); *B61C 5/00* (2013.01); *B61C 7/04* (2013.01); *B61C 17/02* (2013.01); *B61C 17/06* (2013.01);
(Continued)

(58) Field of Classification Search
CPC .. B60L 9/00; B60L 11/00; B60L 11/02; B60L 11/002; B60L 11/12; B60L 11/123; B60L 11/16; B61C 3/00; B61C 3/02
See application file for complete search history.

(56) References Cited

U.S. PATENT DOCUMENTS 4,382,189 A * 5/1983 Wilson .................... F02B 43/10
                                                                     123/1 A
4,900,944 A    2/1990 Donnelly
(Continued)

FOREIGN PATENT DOCUMENTS

WO      2008073353 A2    6/2008

OTHER PUBLICATIONS

International Search Report and Written Opinion dated Jun. 9, 2014 (PCT/NO2014/050022).

*Primary Examiner* — Robert J McCarry, Jr.
(74) *Attorney, Agent, or Firm* — Alix, Yale & Ristas, LLP

(57) ABSTRACT

Device for energy supply of a train set consisting of at least one hybrid- or diesel-electric locomotive. The device comprises at least one gas driven electric power generator, driven by at least one engine or fuel cell which in turn are driven by gas from the at least one container or hydrogen storage facility, wherein the at least one electric power generator is connected to the locomotive electrical power supply networks. The device is arranged for supplying the train set with electrical current supply and/or idle current for a locomotive provided with or without automatic idle stop.

22 Claims, 1 Drawing Sheet

(51) Int. Cl.
- *B60L 11/18* (2006.01)
- *B61C 5/00* (2006.01)
- *B61C 7/04* (2006.01)
- *B61C 17/02* (2006.01)
- *B61C 17/06* (2006.01)
- *B60L 7/00* (2006.01)

(52) U.S. Cl.
CPC ....... *B60L 2200/26* (2013.01); *B60L 2210/30* (2013.01); *B60L 2210/40* (2013.01); *B60L 2220/42* (2013.01); *B60L 2240/36* (2013.01); *B60L 2240/421* (2013.01); *B60L 2240/425* (2013.01); *B60L 2240/443* (2013.01); *B60L 2240/545* (2013.01); *B60L 2240/547* (2013.01); *B60L 2240/549* (2013.01); *B60L 2260/28* (2013.01); *Y02T 10/6217* (2013.01); *Y02T 10/648* (2013.01); *Y02T 10/7005* (2013.01); *Y02T 10/705* (2013.01); *Y02T 10/7044* (2013.01); *Y02T 10/7072* (2013.01); *Y02T 10/7077* (2013.01); *Y02T 10/7241* (2013.01); *Y02T 30/16* (2013.01); *Y02T 30/18* (2013.01); *Y02T 30/40* (2013.01); *Y02T 90/127* (2013.01); *Y02T 90/14* (2013.01)

(56) References Cited

U.S. PATENT DOCUMENTS

| | | |
|---|---|---|
| 5,129,328 A | 7/1992 | Donnelly |
| 6,308,639 B1 | 10/2001 | Donnelly et al. |
| 7,309,929 B2 | 12/2007 | Donnelly et al. |
| 2002/0117857 A1 | 8/2002 | Eckstein |
| 2002/0174796 A1 | 11/2002 | Kumar et al. |
| 2005/0279242 A1* | 12/2005 | Maier ............. B60L 7/04 105/26.05 |
| 2008/0121136 A1 | 5/2008 | Mari et al. |
| 2008/0223250 A1 | 9/2008 | Bachman |
| 2009/0293759 A1 | 12/2009 | Schmitz |

* cited by examiner

DEVICE FOR ENERGY SUPPLY OF TRAINS

BACKGROUND

The disclosure relates to a device for energy supply for trains, and in particular in the form of a gas-driven electric power generator carriage.

Hybrid operation of locomotives by gas is known from US 2002174796 A1, US 2009293759 A1, WO 2008073353 A2 and US 2005279242 A1.

US 2002174796 A1 discloses an energy tender vehicle for use in connection with a hybrid energy locomotive system having energy storage and recovery system. The energy storage and recovery system captures dynamic braking energy, excess energy from the engine, as well as externally supplied energy in one or more energy storage subsystems comprising; a flywheel, a battery, an ultra-capacitor, or a combination of such subsystems. In one embodiment, the energy storage and recovery system are located in an energy tender vehicle. The energy tender vehicle is equipped with optional traction motors. In one embodiment, the tender vehicle is configured to operate without any energy connections to the locomotive. An energy management system responds to energy storage and energy transfer parameters comprising data indicating current and upcoming rail profile information, to determine the present and future electrical energy storage and delivery needs. The energy management system controls accordingly storage and recovery of energy.

US 2009293759 A1 describes hybrid versions of diesel-electric locomotives and improves known technology by placing batteries in standard containers for intermodal transport that can be easily moved with easily accessible cranes built to move cargo containers. The containers are housing standard batteries so that different operators can use them through purchase or rental. This will provide several benefits: 1) after descent from altitude, a fully charged battery unit is removed from the train and put in a stock to reduce the weight of the train unless additional energy is needed for the further journey. For especially long descents, full battery units can be replaced with empty ones, repeatedly, to enable more energy capture as the train continues its descent. (2) Conversely, a train that runs upwards can be loaded with one or more full battery containers from a warehouse to reduce the use of fossil fuels during the ascent and if the need is there, receive replacement units along the trail when the original set does not last long enough to reach the highest point. (3) Various configurations are possible, such as two containers on top of each other to adapt to different needs. (4) Commercial trade with battery containers, made possible through standardization, will create a market for energy which will result in its most efficient use.

WO 2008073353 A2 discloses a hybrid propulsion system comprising a drive engine, a drive system, an energy storage system, a regenerative braking system and a control system applicable for controlling the drive engine, driving, energy storage and regenerative braking systems. Control systems receive input for geographical location, speed and terrain features, and handles energy discharge and energy charge operations.

US 2005279242 A1 describes a hybrid locomotive that can operate in a plurality of operating modes, extensive "slug" operating mode, an energy storage operating mode, a B-locomotive operating mode, five independent operating modes, as well as a source of energy operating mode, and/or can supply electric energy to an external power grid.

Gas operation of locomotives is known from US 2008121136 A1 and U.S. Pat. No. 6,308,639 B1, and the hybrid operation of gas-powered buses is well known.

US 2008121136 A1 describes a hybrid locomotive that includes at least one traction motor connected to at least one of a plurality of shafts and configured to engage at least one shaft. A power conversion system is connected to a main engine, and configured to supply electrical energy to the at least one traction motor and a second energy storage device. A fuel storage device is connected to the engine and configured to supply the main engine with gas fuel. The main engine is adapted to burn gas fuel to reduce emissions, while maintaining excellent power outlet characteristics, which may be supplemented by other sources of energy.

U.S. Pat. No. 6,308,639 B1 describes a switching unit which combines battery storage with a gas microturbine generator to provide a fuel efficient and environmentally friendly locomotive.

Hybrid operation with diesel is known from U.S. Pat. No. 5,129,328 A and U.S. Pat. No. 4,900,944 A, and that separate diesel-driven generator tender carriages for supplying electric train power are known.

U.S. Pat. No. 5,129,328 A discloses a gas turbine powered locomotive, in which a gas turbine is mounted on a locomotive frame. A high-speed alternator is directly connected to said gas turbine. Traction motors are connected by means of an energy control unit for controlling the engine load to the generator for driving a plurality of shafts of the locomotive. Gas storage containers are located on the locomotive frame.

US 2002117857 A1 discloses an electrical energy storage and regeneration system, which uses the electricity generated by dynamic braking of a diesel-electric locomotive to convert water into hydrogen and oxygen gases through hydrogen electrolysis. The gases are compressed, cooled and stored in tanks for later use for supply to fuel cells. Electricity generated by an electrochemical reaction in the fuel cells is used to power the locomotive traction motors. Alternatively, the regenerated electricity is used to supplementing local or regional energy supply. The system can be arranged in a carriage which can be connected directly to a locomotive.

U.S. Pat. No. 4,900,944 A describes a supplementary motor (booster unit) for diesel-electric locomotives that has a frame mounted diesel engine, a generator and several traction motors connected to said generator. A gas turbine is mounted on the frame adjacent to the diesel engine, a high-speed alternator is directly connected to the turbine and various rectifiers coupled to the output of the high-speed alternator. The alternator is adapted to control the output power thereof. The high-speed alternator is connected in parallel with the main train generator, so that the traction motors can be supplied with additional electrical energy when needed.

US 2008223250 A1 discloses a locomotive for passenger transport which captures and stores excess electric energy generated during dynamic braking of the locomotive. This excess energy is converted into energy for use on connected passenger railcars. In cases where the amount of captured energy is too low to meet the demand, the system is supplied with extra energy from the drive engine of the locomotive.

A diesel-electric locomotive has a generator powered by a large diesel engine. This generator operates electric traction motors which facilitate propulsion. The generator may also supply electric power to attached train carriages. Traction motors are also used as braking motors, where they generate electricity when braking—so-called dynamic braking. For ordinary diesel-electric locomotives the power generated from the dynamic breaking is conveyed to large electrical resistors, where the braking power is converted to heat that is wasted.

A hybrid locomotive stores this dynamic braking energy in batteries and reuses it to drive the traction motors in a transition phase before the main generator takes over. There is evidence that this technology can provide savings in fuel consumption in the range of 15 to 20% compared to ordinary diesel-electric drive (U.S. Pat. No. 5,129,328 A). The savings arise by capturing energy which is otherwise lost and by smoothing/equalizing energy consumption by supplying this to the operation of the battery bank.

A disadvantage of the prior art is that since it uses a large diesel generator (non-renewable energy), this will result in substantial energy and disproportionately large emissions of soot and greenhouse gases such as $CO_2$ and $NO_x$ during idling and at slow speed.

Accordingly, there is a need to provide a device for energy supply of trains comprising a gas driven electric power generator arranged for providing energy for supply of electric power to the train/idle current to the train set.

There is further a need to provide a device for energy supply of trains comprising a gas driven electric power generator, which in combination with hybrid operation can be used to achieve significant environmental benefits in combination with diesel/gas/hybrid operation.

There is further a need to provide a device for energy supply of trains comprising a gas driven electric power generator which in combination with the locomotive's main engine/generator is used to achieve an optimized energy smoothing and hence reduced energy consumption during operation of the locomotive and the train set.

SUMMARY

The disclosure provides a device for energy supply of trains which overcomes the above mentioned shortcomings and drawbacks of prior art.

Also provided is a device for energy supply of trains which provides a substantial saving of fuel consumption, compared to regular diesel-electric operation by capturing energy that is otherwise lost and equalize energy by supplying this to the operation from a battery bank.

In another embodiment is provided a device for energy supply of trains comprising at least one separate electric power generator driven by gas, fuel gas or liquid fuel for providing electric energy for powering the train and idle current.

In yet another embodiment is provided a device for energy supply of trains combining a gas driven electric power generator and hybrid operation for achieving significant environmental benefits in combination with diesel/gas/hybrid operation.

In yet another embodiment is provided a device for energy supply of trains, in which braking energy from traction motors is recovered and stored in batteries, can be utilized to power the traction motors alone or together with the main generator.

In one embodiment, the at least one electric power generator of the device is arranged in a separate carriage, so that the locomotive can also be used independently of the present invention, and thus require minimal modifications of present locomotives to allow for the effects of the disclosure.

In one embodiment, a device for energy supply of trains comprising at least one electric power generator is combined with an automatic stop system for the locomotive to provide environmentally friendly and efficient electric train power/idle power in connection with a parked train set.

In yet another embodiment is provided a device for energy supply of trains comprising at least one electric power generator which in combination with the locomotive's main engine is used to achieve an optimized energy smoothing and thus reduce energy consumption during operation of the locomotive and the train set.

Today the situation is such that the dimensioning of the main generator of the locomotive causes a lot of unnecessary energy is lost during idling and generation of electric train power. When the locomotive has only one generator, for example, NSB's Di4 locomotives has to run on level four (of eight engine speed levels) to obtain sufficient electric train power to provide electrical heating and utility power for passenger carriages and possibly other cars. This means that the large main engine is idling at a high speed with a high consumption. To achieve further environmental and cost benefit there is therefore much to be gained from doing something about idling and the generation of electric train power. Idling can be reduced by installing an automatic stop system (AESS) of known type, where the main engine is stopped after a given number of seconds of idling and kept warm by heating and circulating engine coolant. This requires the addition of a minor amount of power; either from batteries or other energy sources. Introduction of AESS thus comes into conflict with the need of electric train power for heating and utilities during the idling time.

In accordance with the disclosed embodiments, there is provided a device for energy supply of trains comprising at least one separate gas, fuel gas or liquid fuel driven electric power generator that addresses this need, and thereby achieves an improvement in fuel economy and lower emissions.

Further smoothing and environmental benefits are achieved through the present invention in that excess capacity of the electric power generator of the device also charge the battery bank for hybrid operation in addition to energy from the traction motors. Fuel reduction will depend on the size of the generator unit and the battery bank, but it is estimated that one can reduce fuel consumption by up to 40%, compared to 20% with existing hybrid technology. As a result of the reduced fuel consumption, and that a part of the energy procured for operation of the locomotive now is obtainable with cleaner operation, then the total $NO_x$ emissions are reduced significantly compared to the diesel-only mode.

Introduction of a device for energy supply of trains, comprising at least one electric power generator with or without hybrid operation, will thus involve a significant improvement in both fuel consumption and environmental impact compared to known technology for locomotives and train operations including; reduced noise, reduced emissions of soot and reduction of greenhouse gases such as $CO_2$ and $NO_x$. This is particularly important at train stations and in urban areas during idling and starting.

The disclosed embodiments contribute to improvement of environmental quality in terms of air quality inside the train cars at stations, and in densely populated communities along the railway line during start up and start of pulling, as well as significant reduction in overall emissions of the $CO_2$ and $NO_x$ emissions, and reduced consumption of non-renewable energy sources. In addition one will achieve a large reduction of noise, which is perceived beneficial, especially when driving at night. A part of the operation based on "shore power" plug-in charging of the battery bank will result in that a part of the energy is provided from renewable energy sources, such as hydro, solar and/or wind power.

In addition to the above, a device for energy supply of trains disclosed herein can be used in combination with the locomotive's main engine for achieving optimized energy smoothing and thus reduce energy consumption during operation of the locomotive and the train set.

BRIEF DESCRIPTION OF THE DRAWINGS

The disclosed embodiments will now be described in more detail with references to the accompanying drawings, wherein.

DETAILED DESCRIPTION

Figure 1:
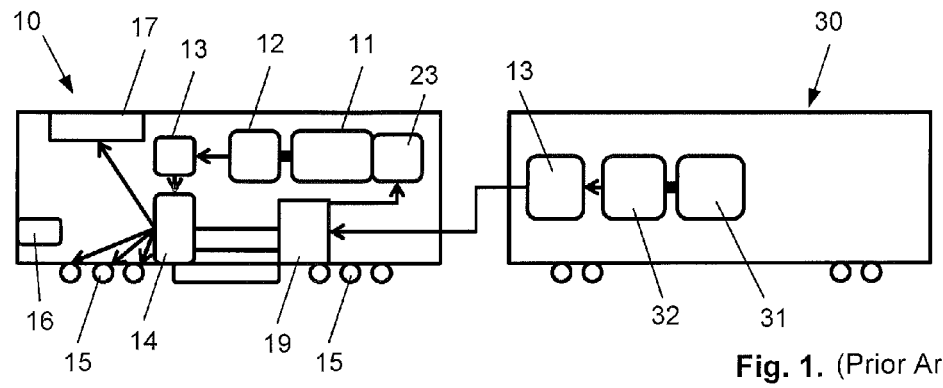
FIG. 1 shows a principle drawing of a diesel-electric locomotive of prior art, with an attached diesel driven genset carriage.

Reference is now to FIG. 1 showing a principle drawing of a diesel-electric locomotive of prior art. A diesel-electric locomotive 10, such as NSB's Di4, or DSB's ME, where a large diesel engine 11 drives an alternator 12. The current is rectified in a rectifier 13 and forwarded to an inverter 14 which converts the current to an AC power characteristic that is suitable for operation of asynchronous traction motors 15 arranged in the bogies, as well as electric power for heating and utilities of the set of train cars, operations of control system 16, and charging of starter batteries in the locomotive 10. The traction motors 15 facilitate the progress of the locomotive 10 and the pulling of possible attached carriages. The traction motors 15 also serves as generators at the deceleration of the locomotive 10, so-called dynamic braking, which saves the train brakes. The power generated by the traction motors 15 for dynamic braking is wasted as heat in a resistance rack 17 (resistor grids) on the roof of the locomotive 10.

If the train set is set up with cars that require a supply of energy, such as refrigerated cars or passenger cars, as applied today, this energy is provided as electrical power from the locomotive 10. The engine 11 has a throttle power actuation control mechanism in eight steps acting on the engine speed. For example; operating passenger trains by the NSB Di4 locomotives, the engine 10 is running at throttle level four, at idling, to provide sufficient energy. For locomotives 10 that do not deliver electric train supply, the use of solutions with their own diesel generator carriages, which comprises at least one diesel engine 31, the AC generator 32 and a rectifier 13 for supplying energy.

Separate diesel driven genset carriages are in use on several railways, such as on the Amtrak Cascades train or Iamród Éireann's CAF Mark 4 Driving Van Trailer (with twin MAN 2846 LE 202 (320 kW)/Letag (330 kVA) engine/generator sets, assembled by GESAN). KiwiRail (New Zealand) use AG class luggage-generator cars for their Tranz Scenic passenger services; Tranz Metro on the Wairarapa line use SWG class passenger carriages with part of the interior adapted to house a generator. The Ringling Bros. and Barnum & Bailey Circus train uses at least one custom-built power car that supplies power to its passenger coaches to avoid reliance upon the host railroad locomotives that haul the train. Norway; Nordlandsbanen passenger trains use separate carts with 2× Scania DSI 14 50 A29T engines with Leroy Somer LSA 50 L2 generators at 580 kW (Assembled by Strommen verksteder).

Separate genset carriages can also be used in joint operation with the locomotives 10 that deliver electric train supply for passenger trains, where the generator cart 30 when inserted in the back of the train set and supplies the rear carriages with electric train supply. The locomotive 10 then supply the front carriages. The Locomotive 10 has as an inverter 14 for electric train supply at e.g. 400 kW, where power is supplied from the main alternator 12. This in turn reduces the power available for the traction motors 15 and thus the pulling capacity of the locomotive 10 is reduced. When one requires increased pulling power for the train, an extra diesel generator carriage unit 30 is inserted directly behind the locomotive 10 (as opposed to the generator cart 30 which hung back the train). Use of diesel generator carriages 30 currently has an adverse environmental effect because the fuel is diesel and that the locomotive 10 main engine 11 is still running at high idle. Generator carriage 30 is not used as a means of or in combination with automatic idling stop system (Auto Engine Start and Stop—AESS).

A locomotive 10 main engine 11 can be equipped with an automatic idling stop system where the main engine 11 is stopped if idle, for example, more than 10 seconds. To exploit this opportunity, the train driver must depend on that the main engine 11 systems are operational, and that the main engine 11 is kept warm and ready to operate at a short notice. Start of large diesel engines requires the availability of sufficient starting current. To start, current is typically available as "shore power" at stations and it is perceived as very risky to trust that you will manage to start on a cold 16-cylinder diesel engine only using the 10 locomotive starting batteries.

Figure 2:
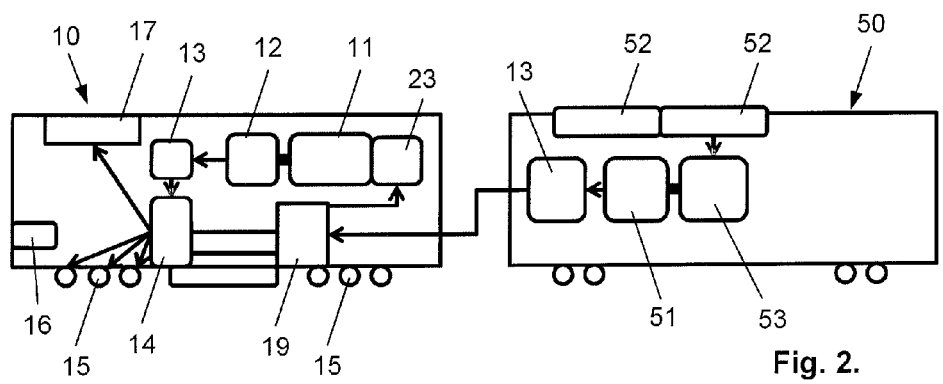
FIG. 2 shows an embodiment of the disclosed device for automatic idling cut plus electric train supply.

Reference is now made to FIG. 2, which shows a first embodiment of the disclosed device, where there is provided a device for energy supply of trains in the form of a gas, fuel gas or liquid fuel driven electric power generator carriage 50, connected to the locomotive 10 grids to ensure sufficient energy to keep the main engine 11 auxiliary and control systems 16 operative to hold the main engine 11 warm when not in use. This solution allows the safe use of AESS, which will reduce emissions considerably.

In accordance with the first embodiment, the device includes one or more gas driven electric power generator(s) 51. For operation of the gas driven generator(s) 51, gas containers 52 are arranged within the generator genset carriage 50 which supplies gas to one or more gas driven engines 53. Gases that can be used are all types of fuel gases or fuel gas mixtures, e.g., compressed natural gas, liquefied natural gas, propane, butane, biogas or hydrogen. The engine(s) 53 can also be driven directly by any type of compressed gas e.g. compressed air. Further, the engines 53 can be heat cycle engines, i.e. engines where one supply heat by either internal combustion, or external combustion (stirling and steam). Another alternative is to use fuel cells instead of the engines. The gas-driven engine(s) 53 operates the one or more electrical power generator(s) 51 (shown as an example an AC power generator) that supplies appropriate current to the locomotive 10 junction box 19, if AC current, via a rectifier 13. From the junction box 19 it is provided suitable power to electric train supply, main engine 11 heater 23, batteries, control system 16 and further auxiliary.

Through this arrangement, a larger portion of the locomotive 10 fuel consumption switches from diesel to gas operation with environmental and economic benefits, and that the total energy consumption is reduced. By arranging the gas driven electric power generator(s) 51 in a separate genset carriage 50 it is also achieved that the locomotive 10 main engine 11 may be used independently of the added equipment, and one gets minimal modifications to the locomotive 10. This enables the advantageous versatility, whereby substantially all existing locomotives can be used with the disclosed device. This is important in the consideration of locomotive owners to invest in new environmentally friendly solutions.

A general environmental effect is also obtained if the disclosed device is utilized as or in combination with a traditional generator carriage unit 30.

Figure 3:
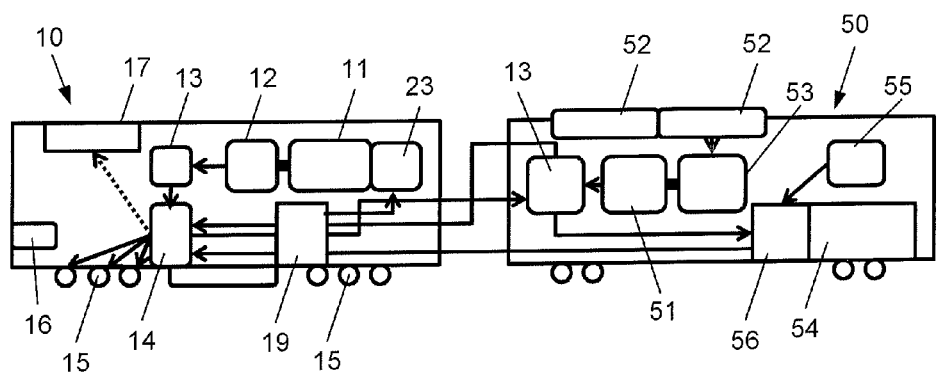
FIG. 3 shows an embodiment of the disclosed device for automatic idling cut plus electric train supply and hybrid operation.

Reference is now made to FIG. 3, showing a second embodiment of the disclosed device, arranged for a combination of automatic idling stop, electric train supply, and hybrid operation. In accordance with the second embodiment, the device further comprises a battery bank 54 and battery charger 55 in addition to the gas driven electric power generator(s) 51, arranged together in a generator carriage 50, which allows a "pool" effect where the locomotive 10 may switch to a fully charged generator carriage 50 on the end of line, or between stations. Alternatively, only the battery pack is changed out with a pre-charged battery pack at train stations. Three generator carriages 50 will, for example, be able to cover all passenger traffic on the Norwegian "Nordlandsbanen" line. Connection to external electric power and gas sources at stations in combination with the gas driven electric generator 51, enables to up-dimension the battery capacity considerably, so an additional environmental benefit is achieved beyond what the hybrid drive provides alone. Tests conducted have shown that hybrid power locomotive provides a fuel savings of, respectively, 15% to 20%. Applicant estimates show that the present invention in combination with the hybrid operation will reduce fuel consumption by an additional 20%, and provide major benefits in emission of soot, $NO_x$ and $CO_2$.

Further power smoothing and environmental benefits in addition to AESS and gas generated electric train supply is achieved by that the gas driven electric power generator 51 excess capacity is used to charge the battery bank 54. The battery bank 54 can then receive electrical energy from three sources:

1. train station based (shore power) charging via either an onboard battery charger 55, or as fast charging DC from an external battery charger, rectifier, or shore based battery bank;
2. surplus electric power from one or more gas driven electric power generator(s) 51 or from a main generator 12,
3. braking power from traction motors 15.

For external connection at station charging, the battery bank 54 is powered up via a battery charger 55. The battery charger 55 communicates with the battery bank 54 control system 56 (BMS—Battery Management System) that controls temperature, charging and power leveling in battery cells. If fast charging with an external (station based) battery charger, rectifier, or battery bank, these devices has to communicate with the BMS 56 to ensure proper charging in accordance with the selected battery characteristics.

Surplus electricity generated from the main generator 12 can also be used to recharge the battery bank 54 through connection via battery charger 55 or as DC power controlled by the BMS 56.

Brake power from traction motors 15 is supplied to the battery bank 54 by utilizing known techniques, such as disclosed in US 2002/0174796, i.e. via a rectifier 13.

The battery bank 54 is used for a short period at the commencement of the train by applying current in suitable form to the locomotive 10 for hybrid operation, as an addition to the energy supplied from the locomotive 10 main generator 11 to the traction motors 15. This increases the hybrid operating advantage and the applicant's estimate, a fuel reduction of up to 40% is achieved, depending on the size of the gas driven electrical power generator(s) 51 and the size of the battery bank 54. In addition, a positive effect is achieved in that since a part of the energy procured for the operation of the locomotive 10 is now obtainable with gas operation, the total emissions of NO reduced significantly compared to pure diesel operation.

The AESS system works in the way that it kicks in after a certain time of idling, which means that the main engine 11 is stopped, while a part of the main engine 11 auxiliaries are kept active, including circulating of heated coolant, so that the main engine 11 can be started quickly and without major environmental damage, compared to cold running. The AESS system requires a certain amount of energy, and also that the starter has available capacity for the starting power. If the locomotive hauls a passenger train, it is also required electric train supply for heating and operation of passenger carriages, while the main engine 11 rests. To obtain such energy there is need for another energy supply, which can be provided in the form of large battery banks and/or a separate smaller generator carriage as per the presented invention, or connection to an external electricity grid where it is feasible (given stations).

In accordance with the disclosure, the supply of fuel to the individual cylinders of the main engine 11 may be cut during idling by electronic fuel control. For example, various cylinders can be run alternately to obtain additional fuel saving.

The gas driven electric power generator 51 does not need to be dimensioned to supply power to operate the locomotive 10 traction alone in connection with starting, but instead the battery bank 54 may be used to deliver a large effect over a short period of time, thus one are not required to run the main engine 11 at a high speed in order to provide enough power for the commencement of the train.

The disclosed device can consequently be considered a gas driven electric power generator carriage 50 which may be connected to one or more existing locomotives 10, without major modifications, resulting in low costs in the introduction.

The device comprising both the battery bank 54 and hybrid components, in the same carriage, makes it very energy efficient and the arrangement enables to utilize all renewable energy sources.

Furthermore, by that the said device according to the disclosure is arranged in a separate carriage unit 50, which can be easily replaced.

Furthermore, the battery bank 54 in generator carriage 50 can be charged with (preferably renewable) electric power at stations.

The device may comprise more than one gas driven electric power generator 51 in a generator carriage 50, which will give better effect smoothing and redundancy.

All battery technologies can be used in conjunction with the device: NiCad, NIME, LiIon, Lead acid batteries, molten salt batteries etc.

The device is further arranged to utilize hydrogen gas (energy source) for energy formation, wherein the hydrogen gas can be produced renewable, e.g. by electrolysis of surplus power at night. This will provide additional environmental benefits.

Hydrogen storage facilities of the carriage may comprise gas, liquid or solid state storage e.g. chemical- or metal hydrides (not shown).

Furthermore, the device may comprise an electrolysis device (not shown) that can generate hydrogen and oxygen by electrolysis of water. This can provide hydrogen gas to fuel the engine 53.

Oxygen from an electrolysis device can be continued to the main engine 11 intake manifold, which may provide further optimum combustion and reduced $NO_x$ emissions and reduced fuel consumption. Alternatively or additionally the device in accordance with the invention may include the use of gas mixtures, such as oxygen/nitrogen, nitromethane, air, etc., with remote filling containers (not shown) in the generator carriage 50.

Furthermore, the device may comprise means for utilizing solar energy from photovoltaic cells for charging the battery bank 54 cells (not shown) which may be disposed to generator carriage 50, thereby continuously charge the battery bank 54, both when the train or carriage is operating and when it is stationary. Other carriages of the train can also be fitted with photovoltaic cells.

According to the disclosure, the largest environmental effect on the onboard generation is obtained if the engine 53 is driven by either compressed air as propellant where the air containers 52 are charged from external sources using renewable energy, or obtained from electric power generation from fuel cells, transforming hydrogen that has been generated from renewable energy sources.

The second largest environmental effect is obtained by using a fuel gas driven combustion engine 53 with a power characteristic that is suitable for driving the electric power generator 51 at an optimum torque.

The third largest environmental effect is obtained by using a liquid fuel driven combustion engine 53 with a power characteristic that is suitable for driving the generator 51 at an optimum torque. This may have some advantages. As an example a diesel driven generator engine 53 may be beneficial in situations where there is no gas distribution available or for safety reasons gas is not allowed.

EU Emission Standards, e.g. EURO-VI requirements, can be used as a guide for choosing appropriate combustion engines. For the hauling of the train e.g. a large two stroke engine is often used. For the generator 51 one can use a newer clean burning four stroke engine 53 to drive the generator 51 at optimum utilization, and an environmental effect is obtained.

All components of the disclosed embodiments may be arranged in parallel connection or in serial connection to obtain the desired redundancy and power. Moreover, all reliability systems may also be arranged serial or parallel connection of the same reason. This makes it possible to use existing components, which will result in reduced costs. For example, one can use several gas driven electric power generator(s) with smaller size, rather than one large.

The gas containers for the operation of the gas engine can be provided in one or more separate units or carriages.

Several genset carriages per the present invention can be connected in series or parallel for increased power and desired features of the locomotive. Furthermore; genset carriages in accordance with the invention connected in series or parallel with traditional diesel driven generator units.

Today's locomotives are also often equipped with a clutched turbo gear. The main engine mechanically drives a turbo compressor at low engine speeds. When the speed is high enough that the exhaust gas can drive the turbo, this gear clutches out. This involves the use of unnecessary energy to drive the turbo at low revs. An improvement of this practice would be to run this turbo with an electric powered motor for low speeds. The energy for the operation of the electric motor is provided by the battery bank 54. Mechanically driven turbo gears are subject to much maintenance, thus a further useful effect of the device is that such maintenance is reduced.

Another aspect is that in terms of energy consumption and greenhouse gas emissions there may be an electric powered compressor to the main engine air intake. This compressor delivers an increased amount of air for a cleaner combustion by increasing boost pressure in the intake manifold. The electric compressor can either be located in the locomotive 10 or in the generator carriage 50. The energy for the operation of the electric compressor generated by the battery bank 54 and/or directly from the gas driven generator 51. Alternatively, or in addition, it is possible to utilize a portion of the air generated from the locomotive brake power air compressor for boosting the main engine intake air pressure 11.

Another aspect is that an electric power from the battery bank 54 may be utilized in a refrigeration system which provides improved intercooling. This improves the combustion characteristics of the main engine 11 further without stealing power from the main engine.

Another aspect of the present locomotive is in that the main engine is converted to bi-fuel operation, which enables it to operate with several types of fuel. In the device, natural gas may, for example, be supplied to the locomotive from at least one container within the generator carriage, so that the locomotive can use both diesel and natural gas as fuel.

Another aspect relates to current locomotives that use a satellite-assisted (GPS/GLONASS/Galileo) throttle control to control the locomotive/train set so efficiently and cost effectively as possible. This can be exploited by the use of information/experience about upcoming track profiles for controlling the throttle switch of the locomotive's main engine and the gas driven electric power generator(s) 51 and the battery bank 54. For example, if the train is approaching a long uphill that requires full throttle, the battery bank may be drained more than usual if a downhill portion is upcoming, until the battery bank in turn can be charged using the traction motors 15. This provides a better energy smoothing.

Another aspect is that the device may provide the generator carriage with a water tank and means to produce steam that can be injected with or without exhaust gas re-circulation in connection with the main engine 11. Alternatively the generator carriage may be provided with means for emulsion, with or without exhaust gas re-circulation. This may help to further reduce the main engine 11 emissions.

REFERENCE NUMERAL LIST

10 Locomotive
11 Diesel Engine
12 Generator
13 Rectifier AC-DC
14 Inverter DC-AC
15 Traction motors AC
16 Control System
17 Resistor grid
19 Junction box
23 Engine heater
30 Generator carriage unit—present diesel driven type
31 Diesel engine generator carriage 32 Alternator AC
50 Generator carriage unit—according to the present invention
51 Electric power generator (s) (Alternator AC (shown)—alternatively a DC dynamo)
52 Gas container(s)
53 Gas driven engine(s)
54 Battery bank
55 Battery charger(s)
56 Battery Management System (BMS)

The invention claimed is:

1. A stand-alone device for energy supply of a train set comprising at least one separate hybrid- or diesel-electric locomotive (10), the stand-alone device comprising:
   at least one electric power generator (51) driven by at least one engine or fuel cell (53) which in turn are driven by gas, fuel gas or liquid fuel from at least one container or hydrogen storage facility (52),
   the at least one electric power generator (51) being connected to an electrical supply system of the separate locomotive (10),
   said device being arranged to supply the train set with at least one of electric train supply or idle current of a locomotive (10) provided with or without automatic engine idle stop, and positioned in or on a separate carriage (50) that is not self-propelled being pulled by the locomotive (10).

2. The device of claim 1, comprising a battery bank (54) for capturing unused energy.

3. The device of claim 2, comprising a battery charger (55) enabling charging of the battery bank (54) by external connection at stations.

4. The device of claim 2, comprising a battery management system (56) to control the charging of and current drain from the battery bank (54).

5. The device of claim 2, configured to charge the battery bank (54) using one or more of:
   the at least one power generator (51),
   external "shore" power at stations via the battery charger (55), or directly to the battery bank (54) as DC via an external charger or rectifier or a pre-charged battery bank,
   surplus power generated by a main generator (12) via the battery charger (55),
   braking energy from traction motors (15) of the locomotive (10), and
   photovoltaic cells arranged on the device or carriages.

6. The device of claim 2, wherein the battery bank (54) is arranged to drive an electrically powered motor driving a turbo compressor for main engine (11) in the locomotive (10) or an electrically powered compressor connected to the main engine (11) in the locomotive (10).

7. The device of claim 2, wherein the battery bank (54) is arranged to provide charge air cooling for the main engine (11) in the locomotive (10).

8. The device of claim 2, wherein one or more fuel or propellant containers is arranged in one or more separate units or carriages.

9. The device of claim 1, wherein the gas for driving the at least one electric power generator (51) is a flammable gas or gas mixture.

10. The device of claim 1, wherein the at least one electric power generator (51) is driven by at least one engine driven by pressure of a compressed gas or gas mixture.

11. The device of claim 10, wherein the compressed gas is air and the container (52) is charged from external sources using renewable energy or by electric power generation from fuel cells, transforming hydrogen that has been generated from renewable energy sources.

12. The device of claim 1, wherein the at least one electric power generator (51) is driven by at least one engine driven by liquid fuel or fuel gas.

13. The device of claim 12, wherein the at least one engine or fuel cell (53) comprises a heat cycle engine.

14. The device of claim 13, wherein the engine (53) is a fuel gas driven combustion engine or a liquid fuel driven combustion engine with a power characteristic that is suitable for driving the electric power generator (51) at an optimum torque.

15. The device of claim 1, being configured for use in combination with a conventional diesel driven generator carriage (30).

16. The device of claim 1, comprising an electrolysis device for generating hydrogen by electrolysis of water to provide hydrogen gas for operation of the gas engine (53).

17. The device of claim 16, being configured to supply oxygen gas formed by the electrolysis device to main engine (11) intake manifold of the locomotive (10).

18. The device of claim 1, comprising at least one container filled with gas mixtures arranged to provide gas mixtures to the main engine (11) intake manifold.

19. The device of claim 1, wherein the locomotive (10) includes a main engine (11) which can be driven by several types of fuel, comprising one or more containers for supplying the locomotive with alternative fuel.

20. The device of claim 1, being configured for communication with a satellite-assisted power control arranged in the locomotive.

21. The device of claim 1, wherein battery bank (54) is made interchangeable with another pre-charged battery bank.

22. The device of claim 1, wherein the generator carriage (50) is provided with a water tank and a heat or pressure source to produce steam that can be injected with or without exhaust gas re-circulation in connection with main engine (11) of the locomotive (10).

* * * * *